United States Patent
Taguchi et al.

(10) Patent No.: US 7,987,300 B2
(45) Date of Patent: Jul. 26, 2011

(54) METHOD OF WRITING CONTROL DATA INTO ON-BOARD VEHICLE CONTROL UNIT AND THE CONTROL UNIT

(75) Inventors: Masatoshi Taguchi, Okazaki (JP);
Yoshiyuki Matsuda, Okazaki (JP)

(73) Assignee: Aisin AW Co., Ltd., Anjo-shi, Aichi-ken (JP)

( * ) Notice: Subject to any disclaimer, the term of this patent is extended or adjusted under 35 U.S.C. 154(b) by 358 days.

(21) Appl. No.: 12/409,152

(22) Filed: Mar. 23, 2009

(65) Prior Publication Data

US 2009/0248912 A1    Oct. 1, 2009

(30) Foreign Application Priority Data

Mar. 25, 2008 (JP) .................................. 2008-078681
Mar. 25, 2008 (JP) .................................. 2008-078682

(51) Int. Cl.
*G06F 13/00* (2006.01)
*G06F 13/38* (2006.01)

(52) U.S. Cl. .............. 710/30; 710/33; 710/62; 709/236; 709/246; 709/247

(58) Field of Classification Search .................. None
See application file for complete search history.

(56) References Cited

U.S. PATENT DOCUMENTS

| | | | |
|---|---|---|---|
| 5,875,454 A * | 2/1999 | Craft et al. ................. | 711/113 |
| 6,370,456 B1 * | 4/2002 | Eiting et al. ................ | 701/33 |
| 6,879,266 B1 * | 4/2005 | Dye et al. ................... | 341/51 |
| 2001/0054131 A1 * | 12/2001 | Alvarez et al. ............. | 711/105 |
| 2003/0130779 A1 | 7/2003 | Shiimado et al. ........... | 701/65 |
| 2004/0004563 A1 * | 1/2004 | Jones et al. ................. | 341/87 |
| 2004/0201765 A1 * | 10/2004 | Gammenthaler ......... | 348/333.01 |
| 2005/0261815 A1 * | 11/2005 | Cowelchuk et al. ........ | 701/36 |
| 2006/0224292 A1 | 10/2006 | Ilzuka ......................... | 701/54 |
| 2008/0034119 A1 * | 2/2008 | Verzunov et al. .......... | 709/247 |
| 2008/0301256 A1 * | 12/2008 | McWilliams et al. ...... | 709/214 |

FOREIGN PATENT DOCUMENTS

| | | |
|---|---|---|
| JP | 07-129079 | 5/1995 |
| JP | 2001-034601 | 2/2001 |
| JP | 2008-056193 | 3/2008 |

* cited by examiner

*Primary Examiner* — Henry W Tsai
*Assistant Examiner* — Michael Sun
(74) *Attorney, Agent, or Firm* — Bacon & Thomas, PLLC

(57) ABSTRACT

A first-type data transfer frame for uncompressed transfer of a control program and control data including reference data, and a second-type data transfer frame for compressed transfer have the same fixed size, and each transfer frame includes compression identification information indicating uncompressed or compressed data. When an on-board vehicle control unit receives a transfer frame with uncompressed control data, the control unit stores the uncompressed control data of the frame in a nonvolatile memory. When the transfer frame has compressed control data, the control unit writes the compressed control data of the frame into RAM, and decompresses control data in the RAM. The control unit sequentially accumulates decompressed control data in the RAM, and when amount of the accumulated control data reaches a setting amount, the control unit halts the decompressing, and transfers the decompressed control data from the RAM into the nonvolatile memory, and restarts decompressing for the next received data transfer frame from the halt point.

6 Claims, 3 Drawing Sheets

METHOD OF WRITING CONTROL DATA INTO ON-BOARD VEHICLE CONTROL UNIT AND THE CONTROL UNIT

BACKGROUND OF THE INVENTION

1. Field of the Invention

The present invention relates to an on-board vehicle control unit that controls operation of an on-board vehicle automatic device, and to a method of writing a control program and/or reference data used in execution of the program into the on-board control unit. While not intended to be so limited, the invention may be used as a transmission controller for controlling operation of an automatic transmission in a vehicle, and as a controller for control of operation of other on-board automatic devices.

2. Description of Related Art

JP-A-2003-202072 describes a control unit in a vehicle, which control unit calculates target speed based on road information and a travel condition, and which provides computer control of a vehicle automatic transmission so that vehicle speed corresponds to the target speed. JP-A-2006-283832 describes a control unit in a vehicle, which control unit uses a CPU incorporating RAM and EEPROM to control an automatic transmission based on a shift lever position and an engine operating condition.

JP-A-2001-034601 describes a method of writing a control program into a nonvolatile memory of a 1-chip microcomputer used for most on-board vehicle control units. The microcomputer mainly includes a CPU, a RAM and a nonvolatile memory (EPROM or EEPROM), wherein the RAM has a smaller storage capacity than the nonvolatile memory. In a first embodiment shown in FIG. 1 of JP-A-2001-034601, a control program is compressed in order to reduce transfer time of the control program and then transferred from an external PROM writer into (the nonvolatile memory of) the microcomputer. The control program is divided into blocks that respectively fit into free spaces of the RAM and each of the blocks is compressed and transferred. However, the program is written while being transferred, which is not suitable for high compression, leading to a low compression ratio. In addition, when the compressed data is decompressed, since the data is compressed and transferred in blocks that respectively fit into free spaces of the RAM, compressed data volume, namely, transferred data volume in a block is small, resulting in relatively little savings in transfer time. Thus, in a second embodiment, the compressed data, in blocks of the control program, is received and sequentially written into the RAM, and then written into the nonvolatile memory, and when all the compressed data of the control program has been stored in the nonvolatile memory, the compressed data is sequentially read from the nonvolatile memory into the RAM and decompressed, and then the decompressed data is then written back into the nonvolatile memory. In the foregoing process, transfer time for transfer of the control program from the PROM writer to the 1-chip microcomputer is shortened, in addition, a compression method with a high compression ratio may be used, and therefore transfer time can be further reduced.

However, since the nonvolatile memory needs to concurrently hold compressed data of a control program and decompressed data thereof, storage capacity of the nonvolatile memory must be increased in correspondence to the amount of compressed data to be held. Moreover, when the control program is written, the same compressed data is written twice into the RAM, in addition, writing and reading of the compressed data must be performed into/from the nonvolatile memory, which increases the volume handled in read/write processing of data from/into the RAM and the nonvolatile memory.

Writing of control data and/or reference data used in the control program is different in data transfer frame formed by the PROM writer or other transfer tools as between uncompressed data transfer and compressed data transfer. In addition, storing processing of data into a nonvolatile memory differs between the storing of compressed data and uncompressed data, the data being received by an on-board vehicle control unit such as 1-chip microcomputer. However, in some cases, it is desirable that all data be transferred as uncompressed data, or that the data be transferred as mixed data of compressed data and uncompressed data. Particularly, since the reference data used in the control program may be frequently changed for convenience of design, the data is sometimes desired to be processed as uncompressed data because easily confirmed. Moreover, when writing a particular identification number, uncompressed data being recognizable as text data is desirably used in some cases.

SUMMARY OF THE INVENTION

A first object of the invention is to enable writing, additional writing, or partial update writing of a control program or control reference data into an on-board vehicle control unit with transfer of data as either compressed data or uncompressed data. A second object of the invention is to achieve such writing while largely avoiding need for increasing storage capacity of the RAM or the nonvolatile memory. A third object of the invention is to achieve such writing without particularly increasing the volume of data read/write processing from/into each of the RAM and the nonvolatile memory.

To achieve the foregoing objects, the invention provides a first-type data transfer frame for transfer, in uncompressed form, a program for controlling operation of an on-board vehicle automatic device, and storage data formed by severally dividing control data including reference data used in execution of the program, and a second-type data transfer frame for transferring storage data formed by severally dividing compressed control data into blocks of compressed data of the same fixed size, wherein each data transfer frame includes compression identification information indicating uncompressed or compressed data. When compression identification information in a data frame received by an on-board vehicle control unit indicates uncompressed data, the control unit stores storage data of the data transfer frame in a nonvolatile memory. When the compression identification information indicates compressed data, the control unit writes the storage data of the data transfer frame into RAM, starts decompression processing, and stores the decompressed control data into the nonvolatile memory. Subsequently, when the control unit finishes the decompression processing of the storage data, the control unit halts the decompression processing. Then, when the control unit receives a subsequent data transfer frame, in the case that compression identification information in the subsequent data transfer frame indicates compressed data, the control unit starts decompression processing of storage data in the subsequent data transfer frame from the halt point, and repeats receiving a data transfer frame and the storing of control data from the data transfer frame into the nonvolatile memory, until all the control data is stored in the nonvolatile memory. To achieve this, the invention provides a method of writing control data into the on-board vehicle control unit.

One embodiment of the present invention is a method of writing control data in an on-board vehicle control unit which has a RAM for temporarily storing writing data and a nonvolatile memory for storing a program for controlling operation of an on-board vehicle automatic device and control data including reference data used in execution of the program. The control data in the nonvolatile memory includes status data indicating the status of the on-board vehicle automatic device. The vehicle control unit generates output data in the RAM based on the status data, and controls operation of the on-board vehicle automatic device according to the output data. In this method, the control unit receives either a first-type data transfer frame having a fixed size, including compression identification information indicating uncompressed data and storage data formed by severally dividing the uncompressed control data for storage in the nonvolatile memory, or a second-type data transfer frame having the same fixed size, including compression identification information indicating compressed data and storage data formed by severally dividing compressed control data obtained by compressing the control data for storage in the nonvolatile memory (27).

In this method, when the compression identification information in a received data transfer frame indicates uncompressed data, the control unit writes the storage data from the data transfer frame into the nonvolatile memory. On the other hand, when the compression identification information in the received data transfer frame indicates compressed data, the control unit decompresses the storage data in the data transfer frame, stores the decompressed data in the nonvolatile memory and then, when the control unit finishes decompression of the storage data, the control unit halts the decompression processing. Subsequently, when the control unit receives another data transfer frame, the control unit starts decompression processing of storage data in the subsequent data transfer frame from the halt point and stores this additional decompressed data in the nonvolatile memory. The control unit repeats of receiving of data transfer frames and the storing of the uncompressed/decompressed control data in the data transfer frames in the nonvolatile memory until all the control data which is uncompressed/decompressed is stored in the nonvolatile memory.

Since the first-type data transfer frame for uncompressed data transfer and the second-type data transfer frame for compressed data transfer have the same fixed size, the frames may be transferred to the on-board vehicle control unit with the same frame configuration. Since each data transfer frame has compression identification information, whether or not decompression is necessary may be easily determined. When the control data is large in size, the data is divided into pieces, and the respective divided pieces are treated as data transfer frames and transferred as such to the on-board vehicle control unit and stored therein. Therefore, the RAM may have capacity only large enough to write and hold one data transfer frame, i.e. to hold a set amount of decompressed control data for writing into a nonvolatile memory. Therefore, the RAM is not required to have such a large storage capacity that all compressed control data and all control data obtained by decompressing the compressed data may be held at the same time. That is, RAM capacity need not be increased for writing. Since volume of data read/written from/into the RAN and the nonvolatile memory is not particularly increased, writing time may be reduced.

In the method of writing control data into an on-board vehicle control unit as described above, wherein the compression identification information is address data that specifies a storage address for the control data in the nonvolatile memory, when the information indicates uncompressed data, that information shows the address data itself, and when the information indicates compressed data, the information shows an area outside an address area of the nonvolatile memory.

In the later-described situation, where the address data is for an area outside the address area of the nonvolatile memory, the address data includes 3 bytes, and "01" of the most significant 2 bits (first 2 bits) of the most significant byte of the address data indicates "compressed data", and "00" indicates "uncompressed data". In this case, the highest order (maximum) address in a storage area of the nonvolatile memory is an address for which the bits are "0". Since transfer destination address data of a leading portion (protocol) of the data transfer frame is combined with the compression identification information, the first-type data transfer frame and the second-type data transfer frame apparently have the same configuration, which further facilitates combined use of uncompressed control data transfer and compressed control data transfer.

In another aspect, the present invention provides an on-board vehicle control unit which includes a RAM for temporarily writing data and a nonvolatile memory for storing a program controlling operation of an on-board vehicle automatic device and control data including reference data used in execution of the program. The vehicle control unit uses the nonvolatile memory to hold status data (as control data) indicating the status of the on-board vehicle automatic device and, in the RAM, generates output data based on the status data, and controls operation of the on-board vehicle automatic device in accordance with the output data.

The control unit receives data transfer frames, each including storage data, formed by severally dividing uncompressed control data to be stored into the nonvolatile memory or by dividing compressed control data, and compression identification information indicating whether or not the storage data is compressed. The data transfer frames all have one fixed size regardless of whether the storage data is compressed or uncompressed. When compression identification information in a received data transfer frame indicates uncompressed data, the control unit stores that uncompressed storage data (in the data transfer frame) in the nonvolatile memory. When the compression identification information in the received data transfer frame indicates compressed data, the control unit decompresses that data (in the data transfer frame), and stores the decompressed data in the nonvolatile memory, then when the control unit finishes decompression of the storage data, the control unit halts the decompression processing, and then when the control unit receives a subsequent data transfer frame, in the case that compression identification information in the data transfer frame indicates compressed data, the control unit starts decompression processing of that data in the subsequent data transfer frame beginning from the halt point and stores the decompressed data in the nonvolatile memory.

The control unit repeats the receiving of data transfer frames and the storing of the uncompressed control data of the data transfer frame in the nonvolatile memory until all the uncompressed control data to be stored in the nonvolatile memory is so stored.

As described above, since a data transfer frame for uncompressed data transfer and a data transfer frame for compressed data transfer have the same fixed size, the frames may be transferred to the on-board vehicle control unit with the same frame configuration. Since each data transfer frame has compression identification information, whether or not decompression processing is necessary may be easily based on that information. In the case of control data having a large volume (size), the data is divided into pieces, and the respective divided pieces are treated as data transfer frames and transferred to the on-board vehicle control unit for storage therein. Therefore, the RAM need have a capacity only large enough to write and hold one data transfer frame, and to hold a setting amount of decompressed control data having setting amount as a writing unit into a nonvolatile memory. In other words, the RAM is not required to have a storage capacity large enough to hold, at the same time, all compressed control data and all decompressed control data obtained by decompressing the compressed data. Thus, the RAM capacity need not be increased for writing. Since the volume of read/write processing of data from/into the RAM and the nonvolatile memory is not particularly increased, writing time may be reduced.

In the present invention, the compression identification information is address data that specifies a storage address in the nonvolatile memory for the control data, and when the information indicates uncompressed data, the information shows the address data itself, but when the information indicates compressed data, the information shows an area outside an address area of the nonvolatile memory.

DESCRIPTION OF PREFERRED EMBODIMENTS

Other objects and features of the invention will become apparent from the following description of a preferred embodiment with reference to drawings.

Embodiment 1

Figure 1:
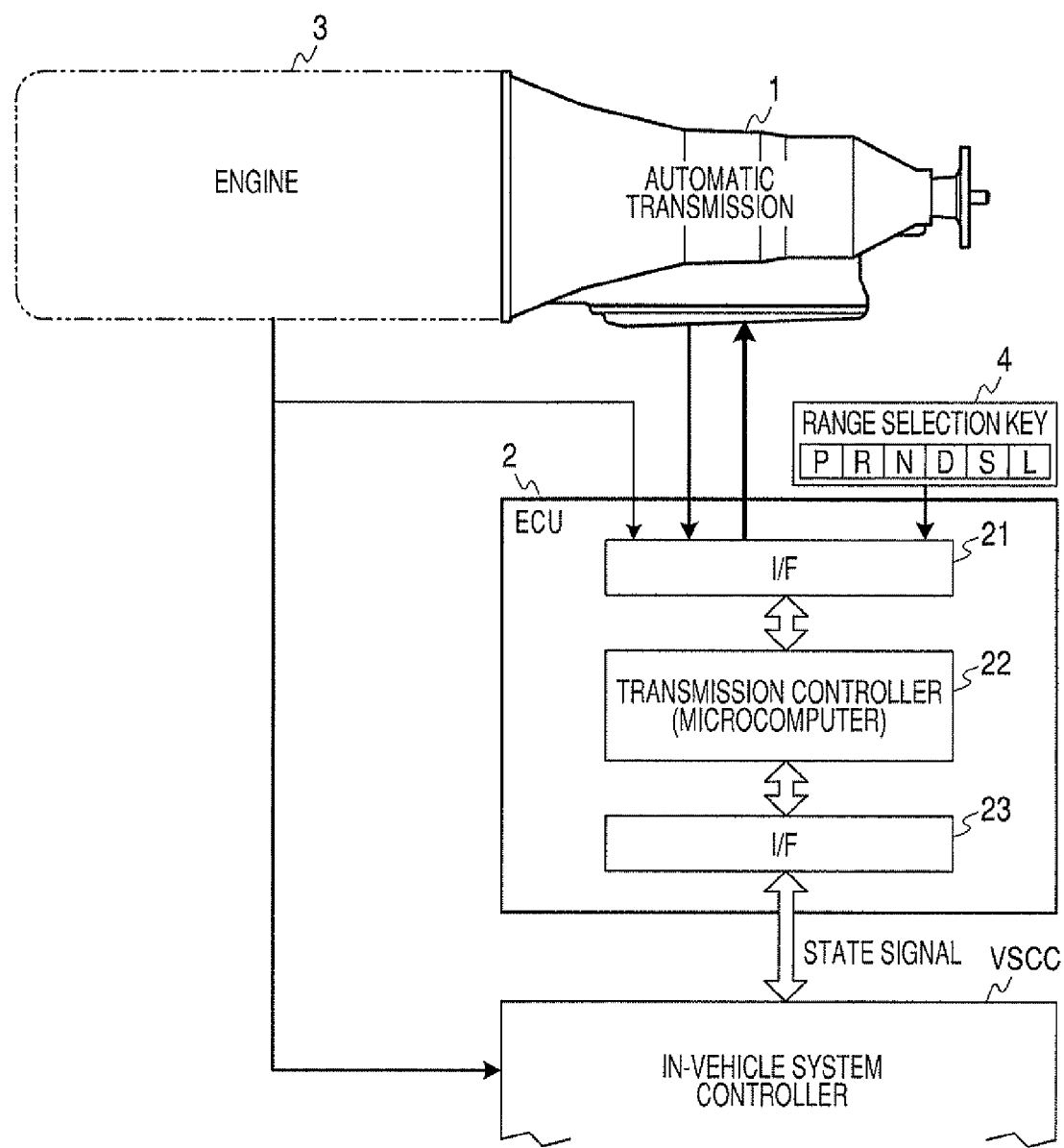
FIG. 1 is a block diagram of a transmission control system equipped with an on-board vehicle control unit according to a preferred embodiment of the invention.

FIG. 1 shows a diagram of a transmission control system equipped with an on-board vehicle control unit 22 of an embodiment of the invention. An automatic transmission 1 has a transmission mechanism, a hydraulic circuit that operates the transmission mechanism, and a solenoid valve group for controlling hydraulic pressures in the hydraulic circuit. The transmission mechanism transmits rotational power of an engine 3 for rotatably driving a wheel drive shaft, changes direction of the engine rotational output, and includes a torque converter, a planetary gear mechanism for multi-stage transmission, a clutch, and a brake. The hydraulic circuit includes an oil pump, and many mechanical valves, orifices and fluid channels. The hydraulic circuit allows hydraulic pressure to be ON (applied) or OFF (drained) for a clutch or brake of the transmission mechanism by opening/closing switching of each valve of a solenoid valve group in the fluid circuit, or by changing hydraulic pressure. Thus, a range, i.e. parking P, reverse R, neutral N, or forward (drive), of the automatic transmission 1 is determined, and a speed range (first speed to sixth speed) for each of the forward and reverse ranges is determined. The solenoid valve group includes a solenoid valve for forward range setting, a solenoid valve for reverse setting, and a solenoid valve for setting of the speed range and lockup.

An electronic control unit (ECU) 2 receives input of status signals such as a brake signal, a throttle opening signal, an engine rotational speed signal, a vehicle speed signal, and input of other signals to be referenced for determining the range and the speed range. The ECU 2 also receives a range instruction signal indicating a key of a range selection key group (electrical switch group) 4 operated by the driver. The ECU 2 determines a range to be set and a speed range, in response to the status signal and the range instruction signal, respectively, and generates a solenoid operational signal instructing switching-on (of current to the solenoid) or switching-off (no current) of each solenoid valve in the solenoid valve group in order to set the automatic transmission 1 to the determined range and the determined speed, and outputs the signal to a solenoid driver (current application circuit) for applying current to each solenoid incorporated in the automatic transmission 1. Thus, each solenoid valve is either ON (receiving current), or OFF.

The ECU 2 has an input/output interface (I/F) 21 that receives status signals indicating an operation condition of the engine 3 and an operation condition of the automatic transmission 1 from the engine 3 and the automatic transmission 1, respectively, receives a range selection signal from the range selection key group 4, and outputs an ON/OFF instruction signal to each of the solenoid valves in a hydraulic circuit of the automatic transmission 1, or outputs an instruction signal instructing change of hydraulic pressure. An input/output interface (I/F) 23 receives status signals showing a drive condition and a travel condition of the vehicle from an on-board vehicle system controller VSCC, serving as the main controller of an on-board vehicle computer system, and outputs a transmission condition signal, indicative of an operating condition of the automatic transmission 1, to the on-board vehicle system controller VSCC. A transmission controller 22 is an on-board vehicle control unit of an embodiment of the invention, which generates operational output data in response to an inputted status signal using a transmission control program, and outputs the data to the I/F 21.

The operational output data is decoded into a transmission operational signal in the I/F 21, and the decoded signal is output to a solenoid driver of the automatic transmission 1. In this embodiment, a 1-chip microcomputer is used as the transmission controller 22, which generates control output data in response to input of the status signal, in accordance with the transmission control program stored in a nonvolatile memory (EEPROM 27 in this embodiment), which is an internal program memory of the microcomputer 22, and outputs the data to the I/F 21.

Figure 2:
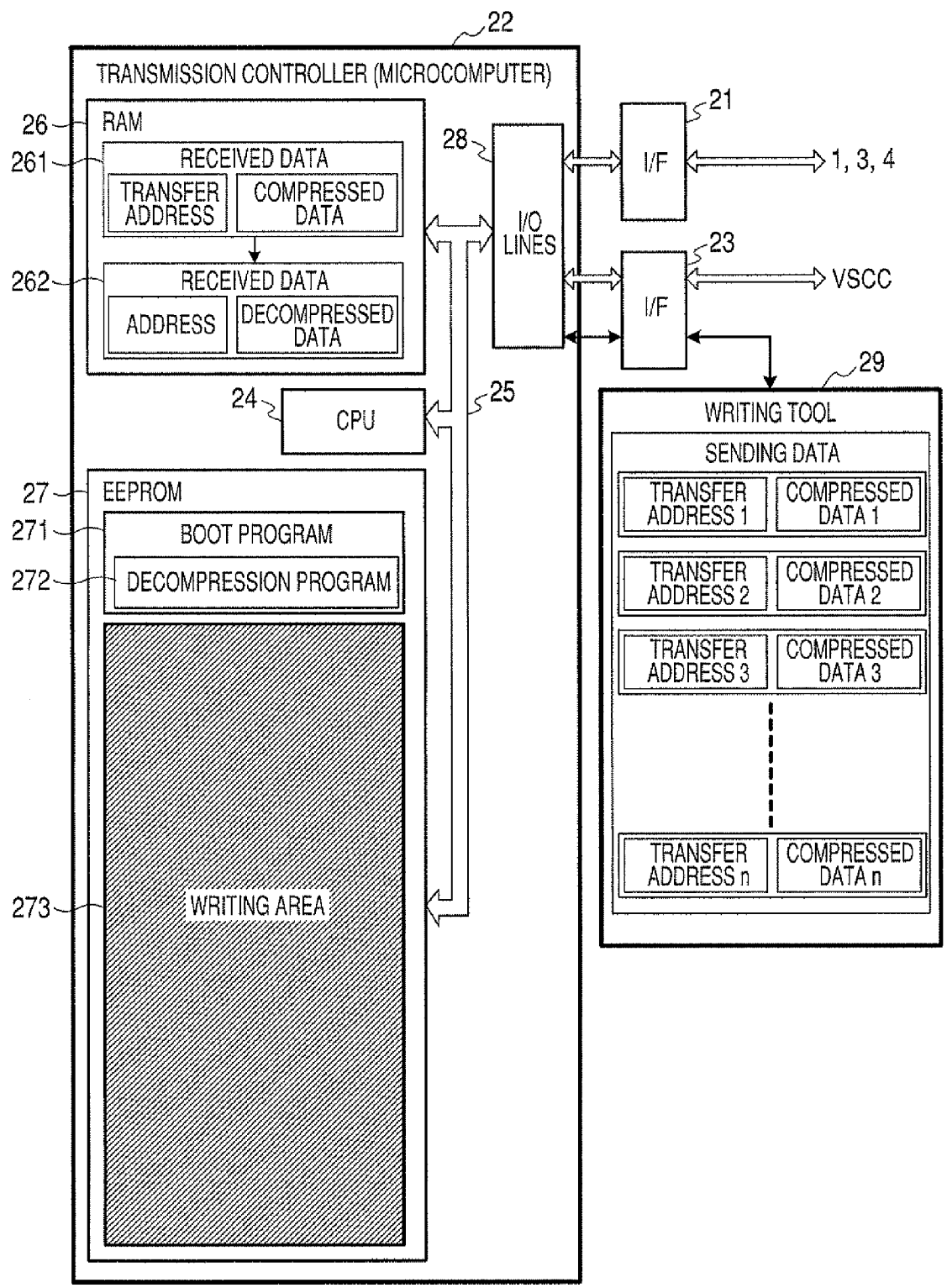
FIG. 2 is a block diagram showing main components of the microcomputer 22 shown in FIG. 1.

FIG. 2 shows the main components of the microcomputer 22. The microcomputer 22 includes CPU 24, a common bus 25, RAM 26, the EEPROM serving as a nonvolatile memory, and an input/output port 28. In transmission control, the RAM 26 holds status data compiled from status signals (input signals) in bytes by the I/F 21, and temporarily holds input/output data such as operational data to be output to the automatic transmission 1 and status data to be output to the on-board vehicle system controller VSCC, and data in an intermediate step of arithmetic processing or logical processing.

The EEPROM 27 holds an operation program for operation of the CPU 24 and reference data in a nonvolatile state. In this embodiment, a boot program writing area 271 is set in the EEPROM 27 in addition to a "control data" writing area 273 for storing (installing) the transmission control program, and the reference data (speed-range boundary data for determining a transmission characteristic, lockup boundary data and the like) used in the program.

In the description which follows, the transmission control program and the reference data are generally expressed as "control data".

FIG. 2 shows the data writing state when the CPU 24 has installed the "control data" in the EEPROM 27 (internal non-volatile memory of the microcomputer 22) according to the boot program.

When the "control data" is installed in the microcomputer 22, a writing tool 29, which stores a data transfer frame incorporating "control data" as shown in FIG. 2, is connected to the input/output port 28 via the I/F 23. In this embodiment, there are two types of data transfer frames for transferring "control data" to be installed from the writing tool 29 into the microcomputer 22.

In the first-type data transfer frame, a protocol including writing address data (3 bytes) of the EEPROM is added to a leading portion of a writing area of uncompressed "control data" of "first setting amount" (data transfer size), the amount being a fixed amount equal to or less than half the free space of the RAM 26 at the time of initiation of the installation.

In the second-type data transfer frame, a protocol including writing address data (3 bytes) of the EEPROM is added to a leading portion of a writing area corresponding to the "first setting amount" of compressed "control data". The most significant 2 bits (first 2 bits) of the most significant byte of the 3-byte address data are "01" indicating "compression". If the address data indicates an address exceeding the maximum address in a writing area of the EEPROM 27, namely, an address outside of a storage area, a real address is expressed by 2 bits of data which are "00". That is, the real address data is obtained by rewriting the 2 bits from "01" to "00". Writing address data in the first-type data transfer frame indicates the real address the 2 bits of which are "00". Alternatively, the real address may be stored as compressed data, and acquired by decompressing the compressed data instead of obtaining the real address by rewriting the 2 bits from "01" to "00".

In the case that uncompressed "control data" is transferred to the microcomputer by using the first-type data transfer frame, when the total amount of uncompressed "control data" exceeds the "first setting (or "set") amount", the writing tool 29 divides the total amount of data by the "first setting amount" so that divided, plural uncompressed first-type data transfer frames are formed, and the writing tool 29 holds the plural data transfer frames.

In the case where compressed "control data" is transferred to the microcomputer by using the second-type data transfer frame, the writing tool 29 compresses the "control data", and when the total amount of the compressed data exceeds the "first setting amount", the writing tool 29 divides the compressed data by a "setting amount" so that plural second-type data transfer frames of divided compressed-data are formed, and the writing tool 29 holds the thus formed plural data transfer frames. FIG. 2 shows a plurality of second-type data transfer frames formed and held by the writing tool 29 in this manner.

The boot program 271 that starts immediately after power-on includes a program 272 that decompresses (decodes) compressed (coded) "control data" in the second-type data transfer frame, and the decompression program 272 is used to decompress compressed "control data". That is, the decompression program is used to restore uncompressed "control data".

Figure 3:
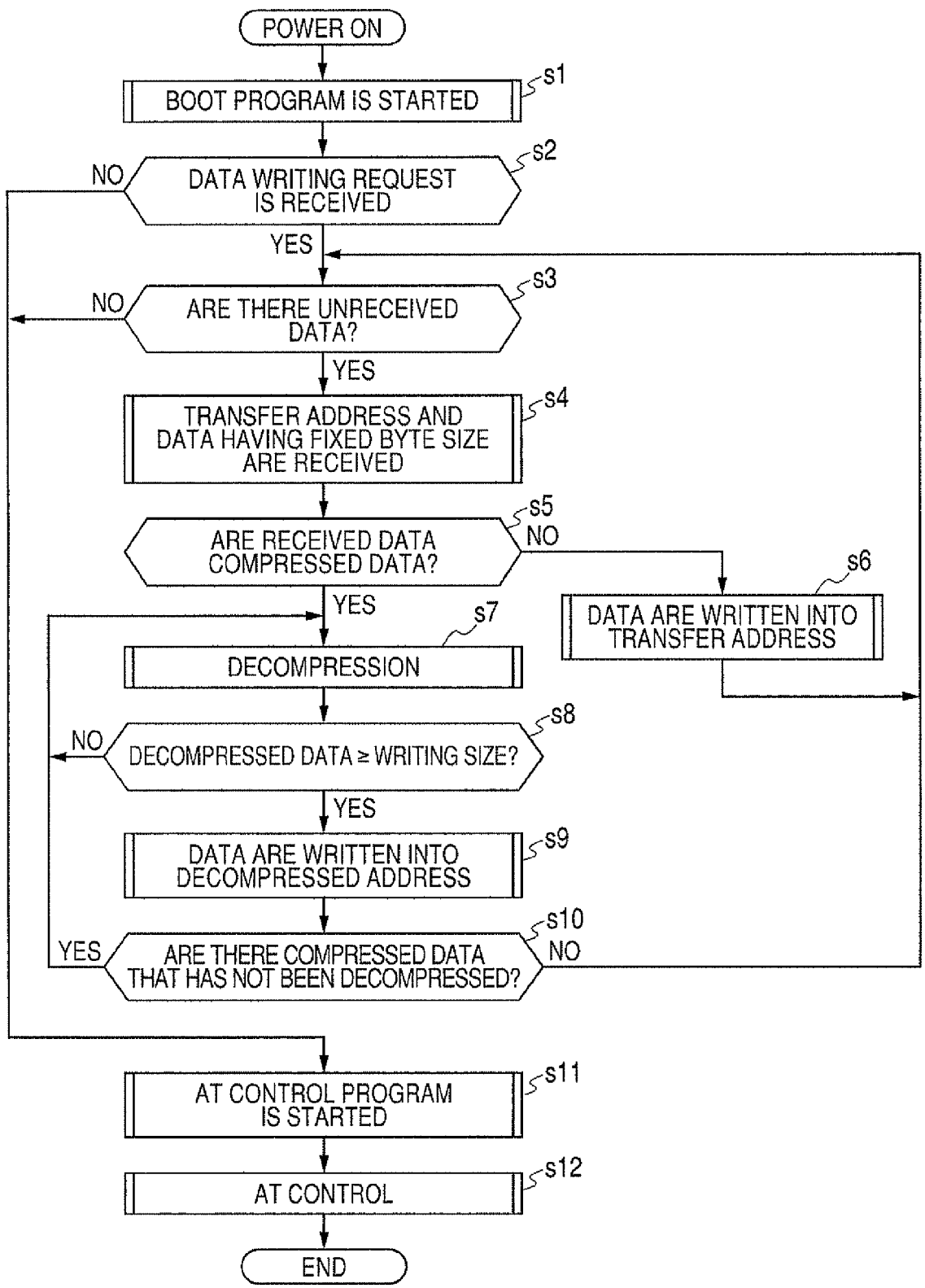
FIG. 3 is a flowchart of a control program stored in EEPROM 27.

FIG. 3 shows a flowchart of a "control data" installation routine executed by the CPU 24. When the CPU 24 receives operation voltage upon power-on, the CPU starts the boot program 271 (step s1), and determines whether or not the writing tool is connected to a writing connection port (communication port of the I/O 28) according to the boot program (step s2).

In the following description, "S" means "step".

When the writing tool 29 is not connected, the CPU 24 starts the control program in the control program writing area 273, and starts transmission control according to the control program (s2-s11-s12).

However, when the writing tool 29 is connected, the CPU 24 communicates with the writing tool 29, and receives a first data transfer frame and writes data from the frame into the RAM 26 (s2 to s4). Next, according to the identification data, i.e. the most significant 2 bits of the most significant byte of 3-byte writing address data of the received frame, when the 2-bit data is "00", (uncompressed) "control data" from the first data transfer frame is directly written into an address area (leading address) or later area of the EEPROM 27, the address being indicated by the 3-byte address data (s5 and s6).

When the compression identification information is "01", (compressed) "control data" from the first data transfer frame is decompressed using a decompression program, and the decompressed "control data" is progressively accumulated in the RAM 26, and when the accumulated amount is equal to or larger than the "setting amount", the decompression is halted, and the control data is written into a leading address area or later area of the EEPROM 27, the address being indicated by data obtained by reading the most significant 2 bits (compression identification information) of the 3-byte address data as "00" (s5-s7 to s9). Decompression is restarted for compressed data subsequent to the compressed data at the halt point (s10-s7). When the amount of decompressed "control data" is equal to or larger than "the second setting amount" having a size of a unit of writing "control data", the decompression is halted, and the control data is written into an address area or later area of the EEPROM 27, the address being an address subsequent to a final address written with previous control data. In this way, every time the amount of the decompressed "control data" becomes equal to or larger than "the second setting amount", decompression is halted, and the decompressed "control data" is written into the EEPROM 27, and when such writing is finished, decompression is restarted.

The first setting amount is different from the second setting amount. That is, the first setting amount has the data transfer size, and the second setting amount is the size of a writing unit of decompressed "control data".

When decompression of the compressed "control data" in the first data transfer frame is completed, decompression is halted, and the decompressed control data is written into the EEPROM 27.

When writing of the "control data" from the first data transfer frame into the EEPROM 27 is finished, the CPU 24 signals READY to the writing tool 29, and in response to this signal, the writing tool 29 sends a second data transfer frame to the microcomputer 22 (s3 and s4).

In the case that transfer data in the second data transfer frame is uncompressed, the CPU 24 performs data processing in the same way when processing a first data transfer frame (s5 and s6).

When the "control data" in the second data transfer frame is compressed, the previously halted decompression is restarted using the "control data" in the second data transfer frame, and the decompressed "control data" is written into an address area or later area of the EEPROM 27, the address area being an address area subsequent to the address for the end of writing the "control data" in the first (most recently received) data transfer frame. Other process steps are the same as in the case of the first data transfer frame (s5-s7 to s10).

Receiving processing of a third or later data transfer frame is the same as the receiving processing of the second data transfer frame. Data size information after decompression is written into the "control data" accommodating area of an initial data transfer frame. When the CPU 24 detects that all the compressed data has been decompressed, based on the data size information after decompression, the CPU 24 writes "control data", in a last data transfer frame accumulated in the RAM, into the EEPROM 27, executes writing end processing, and then starts execution (running) of the control program which has been written into the control program writing area 273 for transmission control according to the control program (s10-s3-s11-s12). End information may be written following "control data" into a "control data" accommodating area of the last data transfer frame instead of writing data size information after decompression into the "control data" accommodating area of the initial data transfer frame, and when the CPU 24 detects the end information, the CPU 24 writes the "control data", in the last data transfer frame accumulated in the RAM, into the EEPROM 27, executes writing end processing, and then starts the control program which has been written into the control program writing area 273.

In the foregoing embodiment, since the first-type data transfer frame which is transferred in an uncompressed form, and the second-type data transfer frame which is transferred in a compressed form have the same fixed size, the frames may be transferred to an in-vehicle control unit with the same frame configuration. Since the data transfer frame has compression identification information, whether or not decompression processing is necessary can be easily determined. For control data having a large size, the data is divided into n pieces, and the respective divided pieces are treated as first to nth data transfer frames, transferred to the microcomputer 22, and stored in the EEPROM 27 which is a nonvolatile program memory. Therefore, the RAM 26 may have a capacity being only large enough to write and hold one data transfer frame, and to hold decompressed control data having the setting amount as a writing unit into the EEPROM 27. In other words, the RAM is not required to have such a large storage capacity that all compressed control data (1 to n) and all control data obtained by decompressing the compressed data may be held at the same time. Further, the volume of reading/writing from/into the RAM 26 and the EEPROM 27 is not particularly increased.

Furthermore, in the foregoing embodiment, even during decompressing data received as compressed "control data" in one data transfer frame, when the amount of the decompressed control data written into the RAM 26 reaches the setting amount, decompression processing is halted and the decompressed control data is written into the EEPROM 27, and decompression processing is restarted from the halt point. The control data is repeatedly decompressed and written into the nonvolatile memory in such a manner until all the compressed control data in the one data transfer frame has been decompressed and stored in the nonvolatile memory, thus avoiding RAM overflow. Further, since the "setting amount" is set to equal to or less than half the free space of the RAM 26, while the storage capacity of the RAM 26 need not be increased, the uncompressed control data may be transferred using the first-type data transfer frame, and stored into the EEPROM 27, in addition, the compressed control data may be transferred using the second-type data transfer frame, and decompressed and stored into the EEPROM 27.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein

What is claimed is:

1. A method of writing control data into an on-board vehicle control unit, which has RAM for temporarily writing data and a nonvolatile memory for storing a control program for controlling operation of an on-board vehicle automatic device and control data including reference data used in execution of the control program, wherein the control data in the nonvolatile memory includes status data indicating status of the on-board vehicle automatic device, wherein the RAM is used to generate output data based on the status data for control of operation of the on-board vehicle automatic device and the RAM is also used to receive control data which is to be stored in the nonvolatile memory, the method comprising:

receiving, in said RAM, (1) a first-type data transfer frame having a fixed size, each first-type data frame including a control data portion obtained by severally dividing uncompressed control data for storage in the nonvolatile memory and compression identification information indicating uncompressed data, and (2) a second-type data transfer frame having the same fixed size, each second-type data transfer frame including a control data portion obtained by severally dividing compressed control data obtained by compressing the control data to be stored in the nonvolatile memory and compression identification information indicating compressed data;

when the compression identification information in a data transfer frame to be received by said RAM indicates uncompressed control data, directly accumulating the uncompressed data in said RAM and then storing the accumulated uncompressed control data of the data transfer frame in the nonvolatile memory;

when the compression identification information in the data frame to be received by said RAM indicates compressed control data, decompressing the compressed control data in the data transfer frame and accumulating the decompressed data in said RAM until a halt point is reached, and then storing the decompressed data in the nonvolatile memory, then if there is additional compressed control data in the data transfer frame, repeating the steps of decompressing the compressed control data until the halt point is reached and storing the decompressed data in the nonvolatile memory until all of the compressed control data of said data frame has been decompressed; and then when the control unit receives a subsequent second-type data transfer frame, starting decompressing of the compressed control data in the subsequent data transfer frame from the halt point and storing the decompressed data in the nonvolatile memory; and repeatedly receiving data transfer frames, decompressing compressed control data and storing the decompressed and uncompressed control data of the data transfer frames in the nonvolatile memory until all the control data is stored in the nonvolatile memory.

2. The method of writing control data into an on-board vehicle control unit according to claim 1, wherein the compression identification information is address data that specifies a storage address in the nonvolatile memory for the control data, and when the compression identification information indicates uncompressed data, the compression identification information shows the address data itself, and when the compression identification information indicates compressed data, the compression identification information shows an area outside an address area of the nonvolatile memory.

3. The method of writing control data into an on-board vehicle control unit according to claim 1, wherein
the halt point is equal to a setting amount, said compressed data being divided by said setting amount before transfer to said control unit to form said frames.

4. An on-board vehicle control unit comprising:
a RAM for temporarily storing data;
a nonvolatile memory storing a program for controlling operation of an on-board vehicle automatic device and control data including reference data used in execution of the program, wherein the control data in the nonvolatile memory includes status data showing a status of the on-board vehicle automatic device, the RAM generating output data, based on the status data, for controlling operation of the on-board vehicle automatic device, the RAM also receiving control data which is to be stored in the nonvolatile memory;
wherein the control data stored in the nonvolatile memory is received by the control unit in the form of plural data transfer frames formed by dividing the control data, each data transfer frame including a divided portion of the control data and compression identification information indicating whether or not the control data in the frame is compressed, all data transfer frames having the same one fixed size regardless of whether the control data is compressed or uncompressed;
wherein when compression identification information in a received data transfer frame indicates that the control data received by the control unit is uncompressed control data, the control unit directly accumulates said uncompressed control data in said RAM and then stores the accumulated uncompressed control data of the data transfer frame in the nonvolatile memory;
wherein when the compression identification information in a received data transfer frame as received by the control unit indicates that the received control data is compressed data, the control unit decompresses the control data of the data transfer frame and accumulates the decompressed control data in said RAM until said halt point is reached, and then stores the accumulated decompressed control data in the nonvolatile memory, and then if there is additional compressed control data in the data transfer frame, repeats the steps of decompressing the compressed control data until the halt point is reached and storing the decompressed data in nonvolatile memory until all of the compressed control data in said data frame has been decompressed, then when the control unit finishes decompression of the control data, the control unit halts the decompressing at a halt point, and then when the control unit receives a subsequent data transfer frame, the control unit starts decompressing the control data in the subsequent data transfer frame beginning at the halt point and stores the decompressed control data in the nonvolatile memory; and
wherein the control unit repeats receiving the data transfer frames and storing uncompressed and decompressed control data from the data transfer frames in the nonvolatile memory until all the control data is stored in the nonvolatile memory.

5. The on-board vehicle control unit according to claim 4:
wherein the compression identification information is address data that specifies a storage address in the nonvolatile memory for the control data, and when the information indicates uncompressed data, the compression identification information shows the address data itself, and when the compression identification information indicates compressed data, the compression identification information shows an area outside an address area of the nonvolatile memory.

6. The on-board vehicle control unit according to claim 4:
wherein the halt point is equal to a setting amount, said compressed data being divided by said setting amount before transfer to said control unit to form said frames.

* * * * *